United States Patent [19]
Koe

[11] Patent Number: 6,097,462
[45] Date of Patent: Aug. 1, 2000

[54] DEFECT COMPENSATION METHOD AND APPARATUS FOR LIQUID CRYSTAL DISPLAY APPARATUS

[75] Inventor: Ho Keng Koe, Kagoshima, Japan

[73] Assignee: Sony Corporation, Tokyo, Japan

[21] Appl. No.: 08/914,119

[22] Filed: Aug. 19, 1997

[30] Foreign Application Priority Data

Aug. 22, 1996 [JP] Japan ................................ 8-221201

[51] Int. Cl.[7] ............................ G02F 1/1337; G02F 1/13
[52] U.S. Cl. ....................... 349/123; 349/124; 349/192; 349/187
[58] Field of Search .................................. 349/192, 123, 349/124, 187

[56] References Cited

U.S. PATENT DOCUMENTS

| | | | |
|---|---|---|---|
| 5,267,066 | 11/1993 | Nakai et al. | 349/192 |
| 5,280,374 | 1/1994 | Nakai et al. | 349/192 |
| 5,465,121 | 11/1995 | Blalock et al. | 349/192 |
| 5,636,042 | 6/1997 | Nakamura et al. | 349/123 |
| 5,847,784 | 12/1998 | Finnila et al. | 349/192 |

FOREIGN PATENT DOCUMENTS 6-130341A  5/1994  Japan ..................... 349/192

*Primary Examiner*—William L. Sikes
*Assistant Examiner*—Kari M. Horney
*Attorney, Agent, or Firm*—Ronald P. Kananen; Rader Fishman & Grauer PLLC

[57] ABSTRACT

A defect compensation method for a liquid crystal display apparatus, where a laser beam is irradiated on an alignment film for aligning an orientation of liquid crystal molecules while monitoring the light transmission rate before the arrangement of polarizing plates until a target light transmittance is reached. As a result, the (molecular orientation) function of the alignment film is lowered to prevent the defective pixel from standing out. The method includes measuring the transmittance of the defective pixel, irradiating with a laser beam, measuring the transmittance of the defective pixel again, calculating an optimum irradiation condition based on the results of the after-irradiation measurement and repeating the irradiation and measurement of transmittance until the desired transmittance is obtained.

11 Claims, 8 Drawing Sheets

TRANSMITTANCE CHARACTERISTIC OF NORMAL PIXEL

TRANSMITTANCE CHARACTERISTIC OF DEFECTIVE PIXEL

DEFECT COMPENSATION METHOD AND APPARATUS FOR LIQUID CRYSTAL DISPLAY APPARATUS

BACKGROUND OF THE INVENTION

1. Field of the Invention

The present invention relates to a defect compensation method and a defect compensation apparatus for a liquid crystal display apparatus for irradiating a defective pixel with a laser beam to correct a light transmittance etc. and to thereby prevent the defective pixel from standing out.

2. Description of the Related Art

The various types of liquid crystal display apparatuses (liquid crystal panels) used for rear projection and front projection displays have as many as several hundreds of thousands to several millions of pixels arranged on the same panel. They are therefore particularly prone to element defects or wiring pattern defects in the switching elements (for example, thin film transistors or metal insulator metal (HIM) diodes) of the pixels. These appear as defects on the screen and lower the quality of the product yield.

As a countermeasure in this case, in for example an active matrix type liquid crystal display (LCD), use was made of a redundant circuit type of trimming method, where a plurality of switching elements were arranged in advance for every pixel and a switching element suffering from a malfunction and causing a pixel to be defective was separated by irradiation of a laser beam to restore the product.

In this redundant circuit type of trimming method, however, excessive switching elements and redundant wiring for irradiating the laser beam for separating them became necessary, so there was the problem that the pixel area was increased and a high degree of integration could not be achieved.

Further, the defective pixels sometimes could not all be restored depending on the size, position, and number of the defects.

For example, where the defect is caused by a particle of dirt, if the particle is large, sometimes it is scattered by the irradiation of the laser beam and creates a large stain-like defective region on the screen. Further, if all of the switching elements for a pixel malfunction, restoration was no longer possible. Further, there were cases where pixels could not be restored by separation of the defective switching element due to the position of the defect.

SUMMARY OF THE INVENTION

An object of the present invention is to provide a defect compensation method and a defect compensation apparatus for a liquid crystal display apparatus for irradiating a defective pixel with a laser beam to correct the light transmittance etc. with a good controllability and thereby make the defective pixel no longer stand out.

To achieve the above object, the present invention provides a defect compensation method for a liquid crystal display apparatus having an alignment film for aligning the orientation of the liquid crystal molecules comprising irradiating the orientation film at the part of the defective pixel with a laser beam so as to lower the molecular orientation function of the alignment film to thereby correct an amount of light emitted by the defective pixel with respect to an amount of the predetermined incident light. The light transmittance of the defective pixel can be freely fixed within the range of change of the light transmittance of the normal pixels on its periphery so that the defective pixel no longer stands out.

In order to perform the correction of the light transmittance with a good controllability, preferably this correction is carried out before the attachment of the polarizing plate.

Namely, in this case, the method is applied to a liquid crystal display apparatus with two substrates each having an alignment film formed on one surface and a polarizing plate allowing only the light of a predetermined direction to pass therethrough on the other surface and comprises irradiating the laser beam after arranging the two substrates with the surfaces on which the alignment films are formed facing each other and filling the space therebetween with liquid crystal, but before arranging the polarizing plates.

Further, if the irradiation of the laser beam is carried out while monitoring the light transmittance and the measurement of the light transmittance and the irradiation of the laser beam are repeatedly carried out until the intended predetermined light transmittance is reached, the controllability can be further enhanced.

The laser beam may be irradiated by changing the energy density of the laser beam or the beam diameter too, but if the beam diameter of the laser beam is reduced and the laser beam is irradiated a number of times while changing the position at the part of the defective pixel, the laser irradiation is stabler and also the energy at each irradiation is smaller, so a further improvement of the controllability of the laser irradiation is possible. Further, the control can be carried out just by changing the relative position of a liquid crystal display apparatus and a laser beam spot, and so so is relatively easy.

Preferably the predetermined light transmittance is set at the black color display side of an intermediate value of the light transmittance at the black color display and the light transmittance at the white color display of a normal pixel.

This is because a so-called "luminance point defective pixel" stands out more in a field of black color due to the high light transmittance of the single pixel than a so-called "dark point defective pixel" stands out in a field of white color. By correcting the light transmittance of the defective pixel to the black color side, the defective pixel will not stand out as a whole.

According to another aspect of the present invention, there is provided a defect compensation apparatus for a liquid crystal display apparatus having an alignment film for aligning the orientation of the liquid crystal molecules, provided with a light source which emits light to a defective pixel; a light receiving means for receiving the light emitted from the defective pixel; a measuring means for measuring the amount of the light emitted by the defective pixel with respect to the predetermined amount of incident light based on the amount of light received by the light receiving means; a controlling means for setting the irradiation conditions of a laser so that the light of the predetermined amount of emitted light is output from the defective pixel; and a laser irradiating means for irradiating the laser beam to the alignment film at the part of the defective pixel based on the irradiation conditions to lower the molecular orientation function of the alignment film.

It is also possible to further provide a displacing means for changing the irradiation position of the laser beam by a predetermined amount at the defective pixel. In this case, the irradiation conditions include the amount of displacement, the direction of displacement, and the number of times of displacement of the irradiation position of the laser beam by the displacing means.

BRIEF DESCRIPTION OF THE DRAWINGS

These and other objects and features of the present invention will become clearer from the following description of the preferred embodiments given with reference to the attached figures, in which.

DESCRIPTION OF THE PREFERRED EMBODIMENTS

Figure 1:
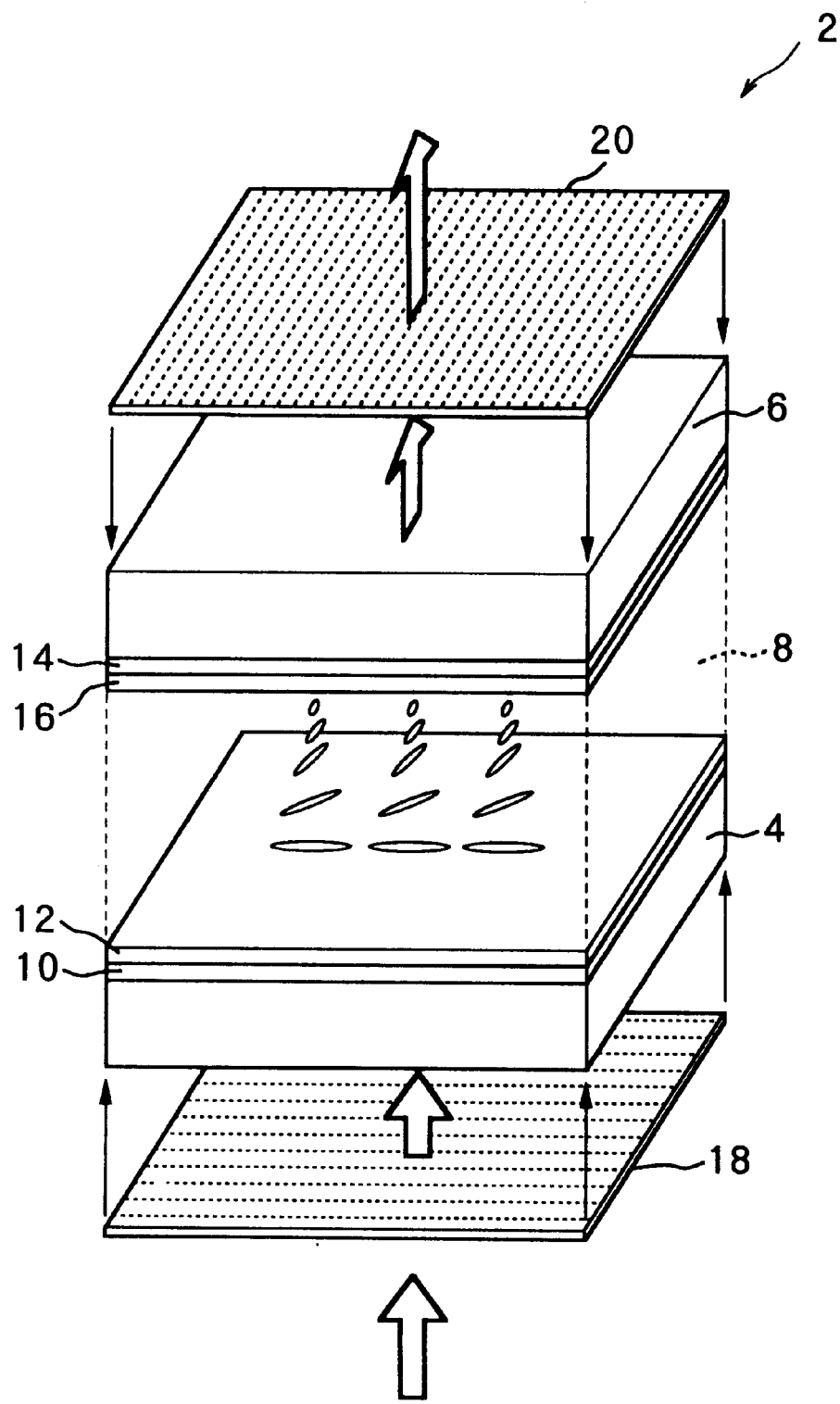
FIG. 1 is a structural view of one pixel part showing the schematic configuration of the liquid crystal display apparatus according to an embodiment of the present invention.

Before explaining the defect compensation method and the defect compensation apparatus of a liquid crystal display apparatus according to the present invention, an explanation will be made of the general structure of the liquid crystal display apparatus to which the present invention is applied referring to the drawings.

Although not particularly limited, the liquid crystal display apparatus (liquid crystal panel) to which the present invention is applied is particularly preferably a matrix display system having a large number of pixels. The drive system may be a simple matrix drive system or active matrix drive system. Further, the display may be either of the reflection type or transmission type.

Below, the explanation will be made by taking as an example a case an active matrix drive system where the drive element is a thin film transistor (TFT).

Figure 2:
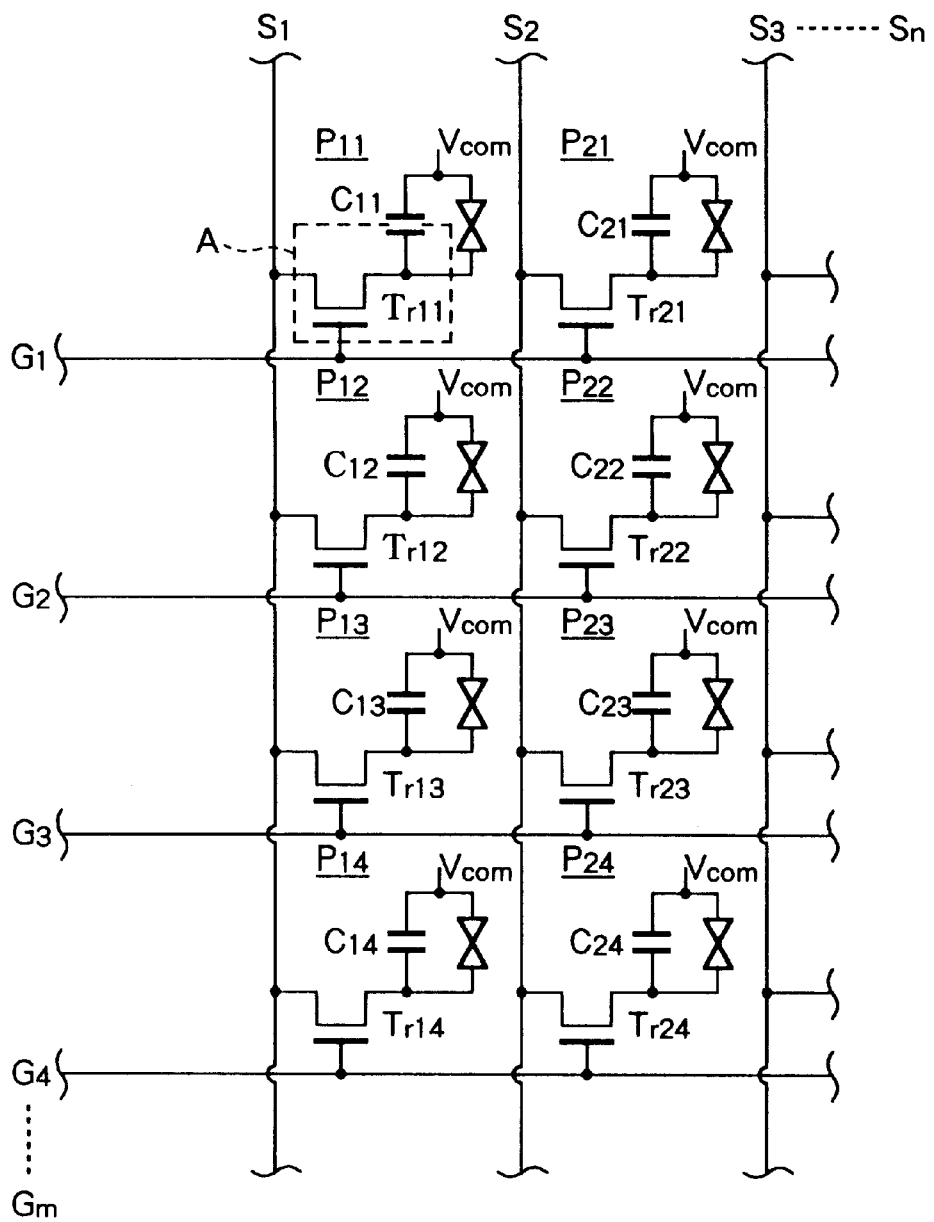
FIG. 2 is an equivalent circuit diagram of the liquid crystal display apparatus.

FIGS. 1 and 2 show the general configuration of a liquid crystal panel, that is, FIG. 1 is a structural view of a pixel part of the liquid crystal panel, and FIG. 2 is an equivalent circuit diagram.

As shown in FIG. 1, a liquid crystal panel 2 is generally comprised of two substrates 4 and 6 facing each other. A liquid crystal is sealed in the gap between the two to form a liquid crystal layer 8.

For these two substrates, even single crystalline silicon can be used in a MOS FET or other reflection type system, but in a TFT type system, in order to allow the light from the backlight to pass therethrough, a quartz glass substrate having a thickness of about 0.8 to 1.1 mm is used. Here, the substrate 4 at the lower side of the figure (backlight side) will be referred to as a drive substrate, and the substrate 6 at the upper side of the figure (panel surface side) will be referred to as the counter substrate.

On the surface of the liquid crystal side of the drive substrate 4, as shown in FIG. 2, signal lines S1, S2 . . . , Sn to which the pixel signals are supplied and gate lines G1, G2, . . . , Gm to which the scanning signals are supplied are arranged in the form of matrix. Thin film transistors (nMOS transistors Tr11, Tr12, Tr21, Tr22, . . . , Trnm, below, indicated as "Trij") are provided near intersecting points.

The gate of each nMOS transistor Trij is connected to one of the gate lines G1, G2, . . . , Gm, and one impurity diffusion layer of this is connected to one of signal lines S1, S2, . . . , Sn.

On an nMOS transistor Trij, as shown in FIG. 1, a transparent pixel electrode 10 separate for every pixel is formed. An alignment film 12 for aligning the molecule orientation of the liquid crystal layer 8 is formed on top of this.

The pixel electrode 10 is constituted by a transparent conductive film made for example of indium tin oxide (ITO). Although the thickness of the film is not limited, it is for example about 140 nm. The alignment film 12 may be an inorganic film, but usually an organic film such as a polyimide film having a thickness of several tens of nm is used. On the surface of the alignment film 12, rubbing treatment is applied in one direction (left and right direction in FIG. 1).

On the other hand, although not particularly illustrated, on the liquid crystal side surface of the counter substrate 6, a color filter is formed by providing black stripes at the two sides. A transparent common electrode 14 made of ITO film or the like is formed on the liquid crystal side surface of the color filter as shown in FIG. 1 and is covered by the alignment film 16. The surface of this alignment film 16 is also subjected to the rubbing treatment, but the direction thereof crosses that of the alignment film 12 on the drive substrate 4 side by 90 degrees. By this, in the liquid crystal layer 8, as shown in FIG. 1, a state where the molecular orientation is twisted by 90 degrees in the direction of thickness is established. Note that, the thickness of the liquid crystal layer 8 is about several micrometers.

A capacitor is constituted by sandwiching the liquid crystal layer 8 by the common electrode 14 and the pixel electrode 10.

On the equivalent circuit of FIG. 2, one impurity diffusion layer of each nMOT transistor Trij has one of the capacitors C11, C12, C21, C22, . . . , Cnm and liquid crystal respectively connected in parallel. The common electrode 14 is held at a common voltage Vcom.

At the outside surfaces of the drive substrate 4 and the counter substrate 6 are attached polarizing plates 18 and 20. The polarizing plates 18 and 20 are arranged so that their light absorption axes are orthogonal to each other.

When the backlight beam strikes the liquid crystal panel 2 having such a structure from the outside of the drive substrate 4, the light passes through the polarizing plate 18 to be polarized to one direction and then passes through the drive substrate 4 and the pixel electrode 10 to strike the liquid crystal layer 8.

During a period when the light is passing through the interior of the liquid crystal layer 8, the direction of polarization of the light changes by 90 degrees along with the molecular orientation of the liquid crystal by the effect of the optical anisotropy of the liquid crystal molecules. The light then passes through the common electrode 14 and the counter substrate 6 to strike the polarizing plate 20. Since the direction of polarization of this polarizing plate 20 crosses the direction of polarization of the polarizing plate 18 through which the light first passed by 90 degrees, the light striking the polarizing plate 20 coincides in the direction of polarization with the direction of polarization of the polarizing plate 18, so most of the light is emitted to the panel surface side. Accordingly, the surface of the pixel appears bright due to the backlight resulting in a "white" display.

At the time of a white display, no voltage is applied to the space between the pixel electrode 10 and the common electrode 14.

Contrary to this, when a voltage is applied to both of the electrodes 10 and 14, the molecular orientation of the liquid crystal layer 8 is gradually aligned in the vertical direction in accordance with the electric field.

Figure 3:
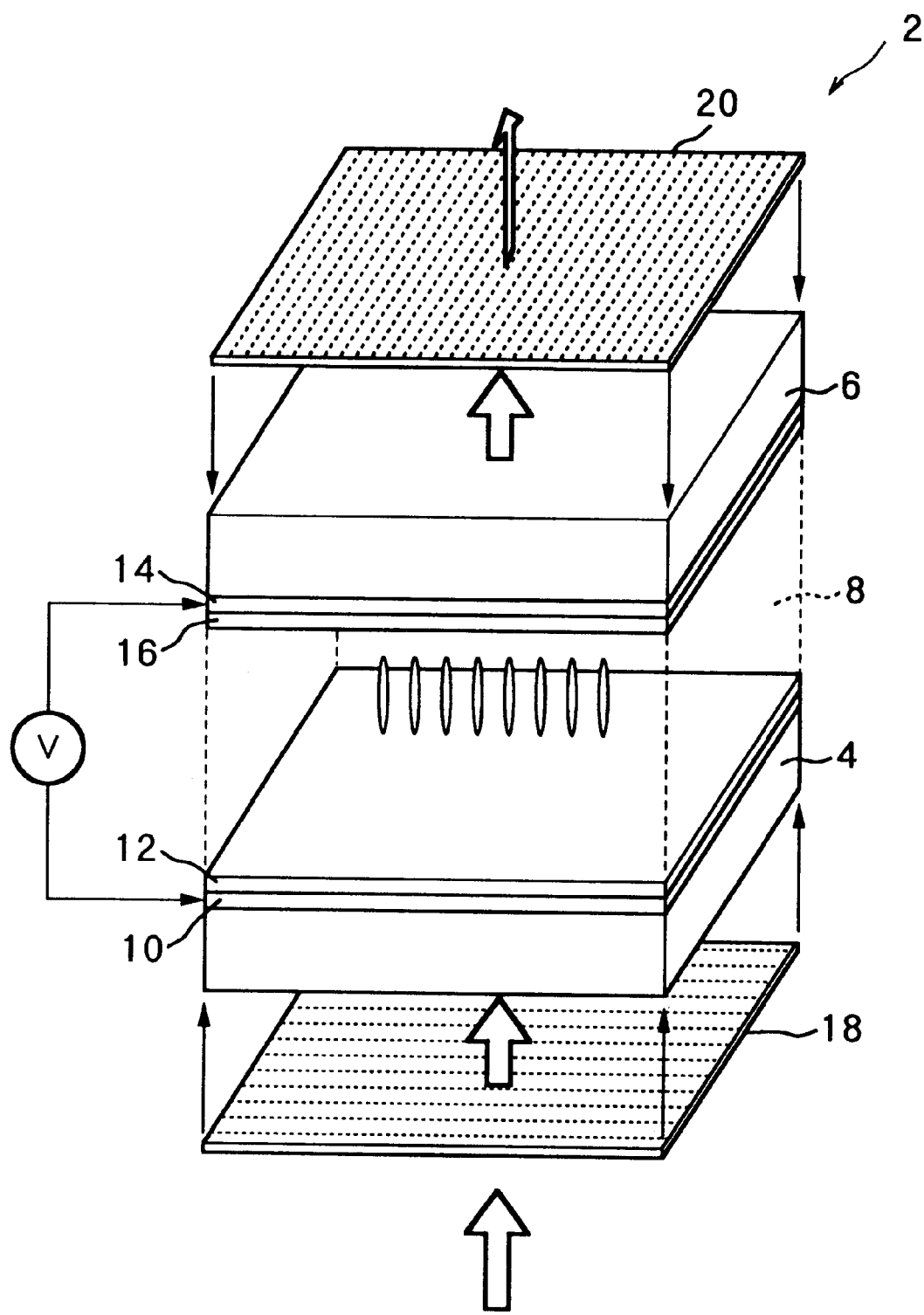
FIG. 3 is a structural view of the liquid crystal display apparatus showing a case where a sufficiently high voltage is applied to a space between electrodes of the same liquid crystal display apparatus.

FIG. 3 shows a case where the voltage is sufficiently raised. In this case, the direction of polarization of the light passing through the interior of the liquid crystal layer 8 does not change much at all. Therefore almost no light passes through to the panel surface side, so the surface of the pixel appears dark resulting in a "black" display.

Figure 4:
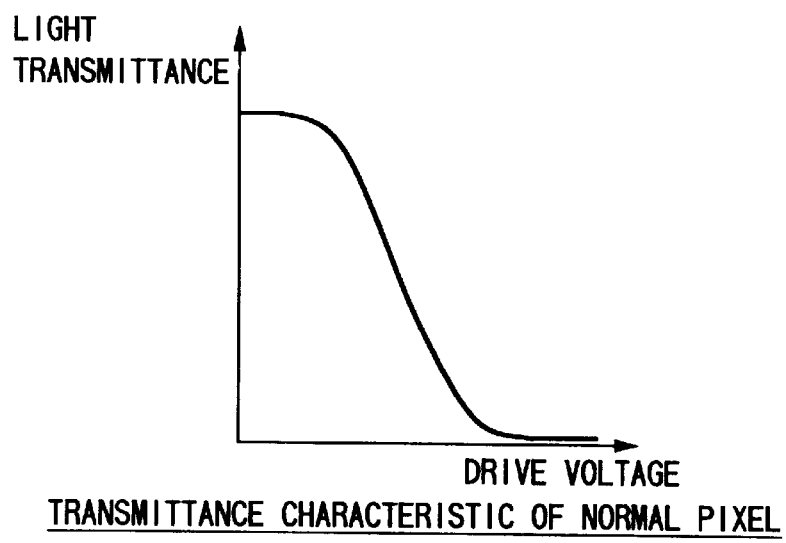
FIG. 4 is a characteristic view of the transmittance showing the situation of an attenuation of the light transmittance accompanying an increase of a drive voltage.

FIG. 4 shows the transmittance characteristic such as attenuation of the light transmittance accompanying an increase of the drive voltage.

As seen also from this characteristic view, in such a liquid crystal panel 2, a halftone of the white display and the black display can be realized by adjusting the applied voltage. Further, a color display is possible using color filter (not illustrated).

This voltage adjustment is determined by the potential difference (drive voltage) of the potential of the image signal supplied to the signal lines S1, S2, . . . , Sn and the common potential Vcom when the gate lines G1, G2, . . . , Gm are selected in accordance with the scanning signal.

Next, a detailed explanation will be made of the defect compensation method and defect compensation apparatus of the present invention taking as an example a case where the above liquid crystal panel 2 is used.

According to the present invention, the light transmittance etc. of a defective pixel is corrected by lowering the molecular orientation function of the alignment films 12 and 16 of FIG. 1.

Figure 5:
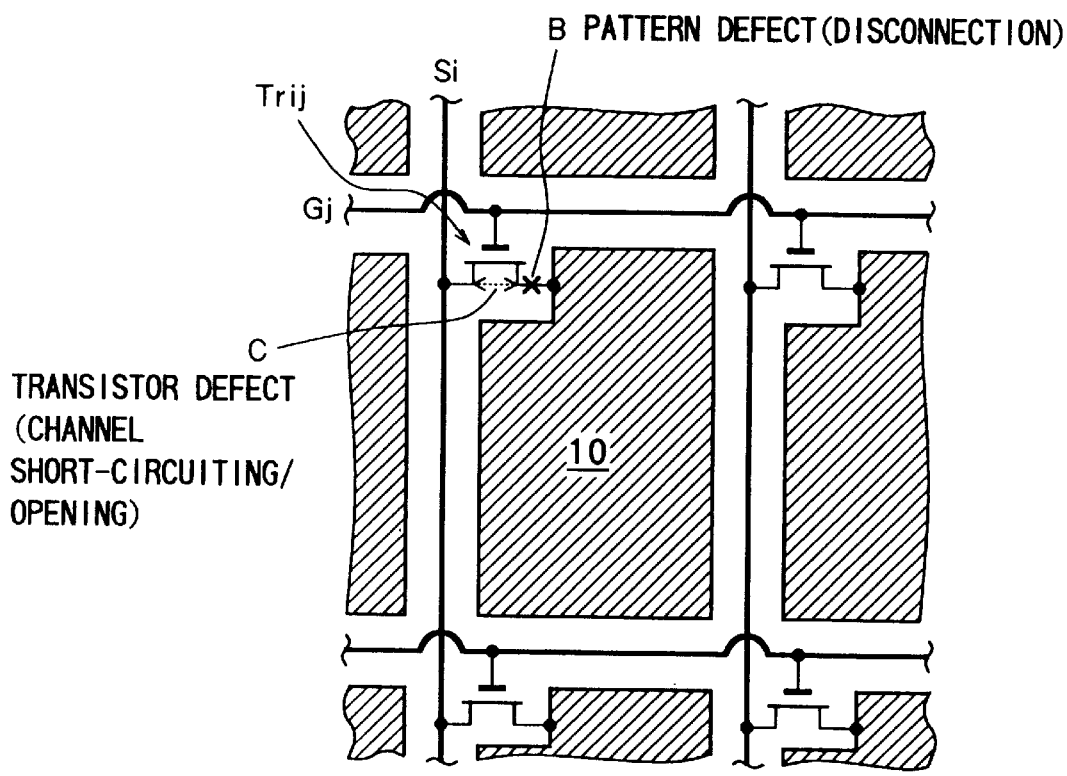
FIG. 5 is a view diagrammatically showing the situation at a drive substrate on which a pixel electrode is formed so as to indicate a trouble mode of the defective pixel.

First, a brief explanation will be given of a "defective pixel". FIG. 5 is a view diagrammatically showing the situation at a drive substrate 4 on which a pixel electrode 10 is formed and in which the A part of FIG. 2 is repeatedly arranged.

In the process of manufacture of the liquid crystal panel 2, sometimes a defective pixel is produced due to dirt, a defect in the mask pattern, etc.

One type of trouble which is encountered is when the wiring layer between the pixel electrode 10 and the mMOS transistor Trij (or the wiring layer between the signal line S1 and Trij) is disconnected (hereinafter referred to as a pattern defect) as indicated by a symbol B in for example FIG. 5. Another type of trouble mode, as indicated by a symbol C in FIG. 5, is when there is an abnormality in the nMOS transistor Trij per se and the channel remains short-circuited or remains open (hereinafter referred to as a transistor defect).

A defective pixel which shines brightly with a high light transmittance due to not being supplied with a drive voltage despite the surrounding pixels receiving substantially the same predetermined drive voltage as a result of trouble, such as disconnection of the pattern or opening of the channel of the transistor, is called in particular a "luminance point defective pixel" or a "bright defect".

Further, a defective pixel which remains dark with a low light transmittance due to being supplied with a drive voltage despite the surrounding pixels not being supplied with the predetermined drive voltage as a result of trouble such as channel short-circuiting etc., such defective pixels that the predetermined drive voltage is not is called in particular a "dark point defective pixel" or "dark defect".

Between them, a luminance point defective pixel stands out more in a black field than a dark point defective pixel in a white field, so the present invention will be explained below by taking as an example a case of a luminance point defective pixel.

Figure 6:
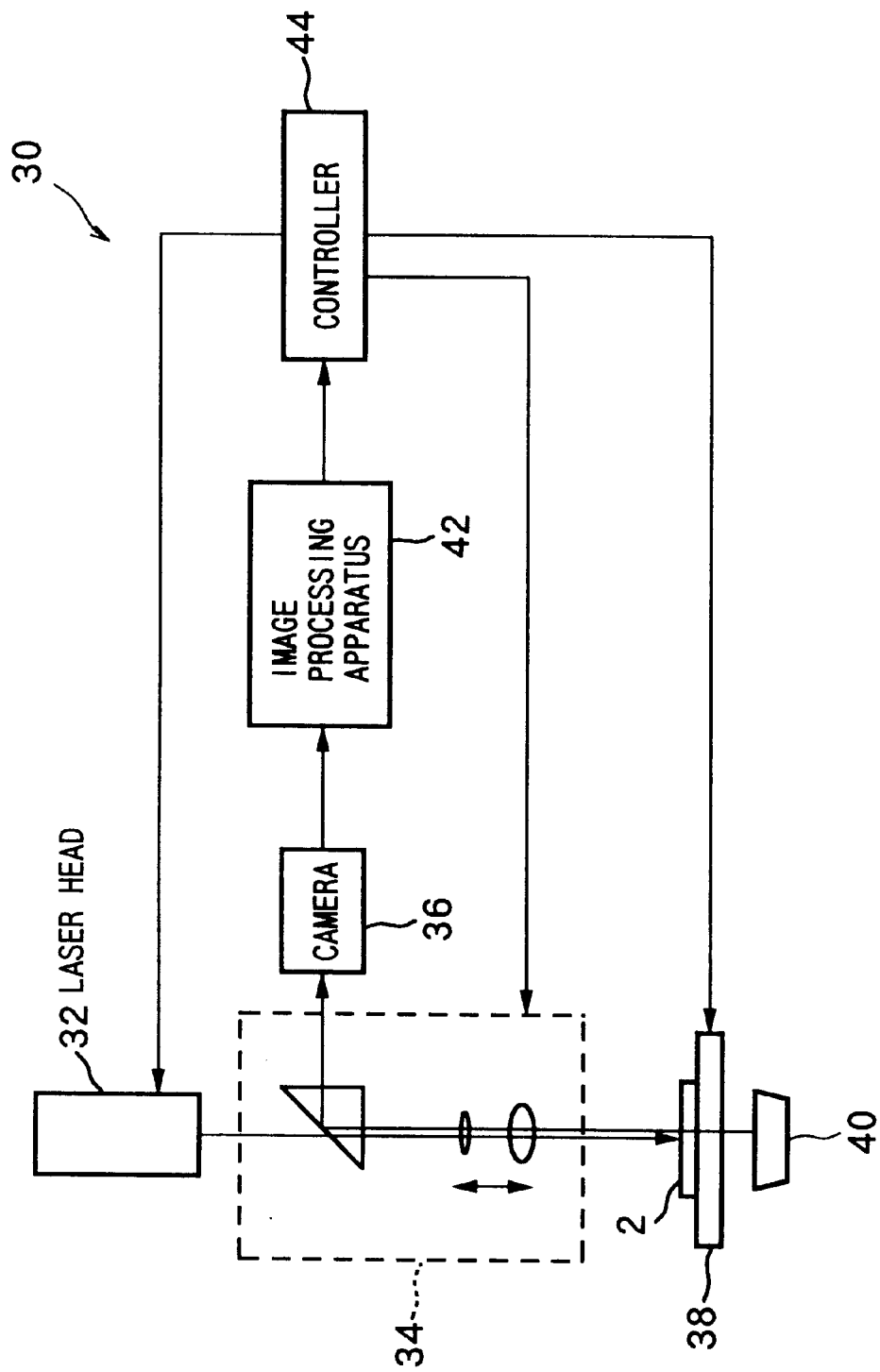
FIG. 6 is a schematic structural view of a defect compensation apparatus according to an embodiment of the present invention.

FIG. 6 is a schematic structural view of the defect compensation apparatus of the present invention.

This defect compensation apparatus 30 is constituted by a laser head 32 for generating a laser beam, a microscope 34 for reducing the beam diameter of the laser beam and observing the liquid crystal panel 2, a camera 36 for converting the image from the microscope 34 to an electric signal, an X-Y stage 38 for supporting the liquid crystal panel 2 and performing the positioning, a backlight source 40, an image processing apparatus 42 for measuring the light transmittance of the pixels, and a controller 44 for controlling the laser head 22 etc. based on the light transmittance.

Next, the specific routine for the defect compensation will be explained along with the flowchart of FIG. 7.

First, the liquid crystal panel 2 to be corrected for defects is placed on the X-Y stage 38, then the address of the defective pixel of the liquid crystal panel 2 is input to the controller 44 (step ST1). The address can be manually input too or the controller 44 can automatically fetch the address information from a not illustrated inspection apparatus.

The controller 44 controls the X-Y stage 38 in accordance with the input address of the defective pixel to move the defective pixel into the range of vision of the camera 36 (step ST2).

Then, the backlight source 40 is turned on by an instruction from the controller 44, the amount of the transmitted light is converted to an electric signal via the camera 36, the light transmittance of the defective pixel is measured at the image processing apparatus 42 based on the amount of the transmitted light indicated by this electric signal, and then the optimum irradiation conditions are calculated and set by the controller 44 based on the result of measurement (step ST3).

The optimum irradiation conditions differ according to the degree of light transmittance set for the defective pixel. It is possible to set the intended predetermined light transmittance to any value within the range of change of transmittance of a normal pixel, but preferably it is set to the black color display side from the intermediate value of the transmittance at the black color display and the transmittance at the white color display of a normal pixel.

This is because, as previously mentioned, a luminance point defective pixel stands out more in a dark field, where only one pixel would then have a high light transmittance, than a dark point defect would stand out in a white field. If the light transmittance of the defective pixel is corrected to the black color side, the defect will not stand out much overall.

The controller 44 adjusts the output of the laser head 32 according to the set irradiation conditions. At the same time, the controller 44 controls the optical system of the microscope 34 to adjust the laser beam to a predetermined beam diameter (or energy density) at the alignment film 12 or 16 of the liquid crystal panel 2. The laser beam is then irradiated to the defective pixel (step ST4).

It is possible to irradiate the laser beam aiming at the predetermined light transmittance by a single shot, but in the present embodiment, the irradiation is carried out a number of times while incrementally shifting the irradiation position at the defective pixel.

In this case, the irradiation conditions set by the controller 44 at the above step ST3 includes the amount of incremental displacement, the direction of displacement, and the number of times of displacement. Further, the controller 44 at this time controls the laser head 32 and the microscope 34 and in addition moves the X-Y stage 38 in fine increments.

Figure 8:
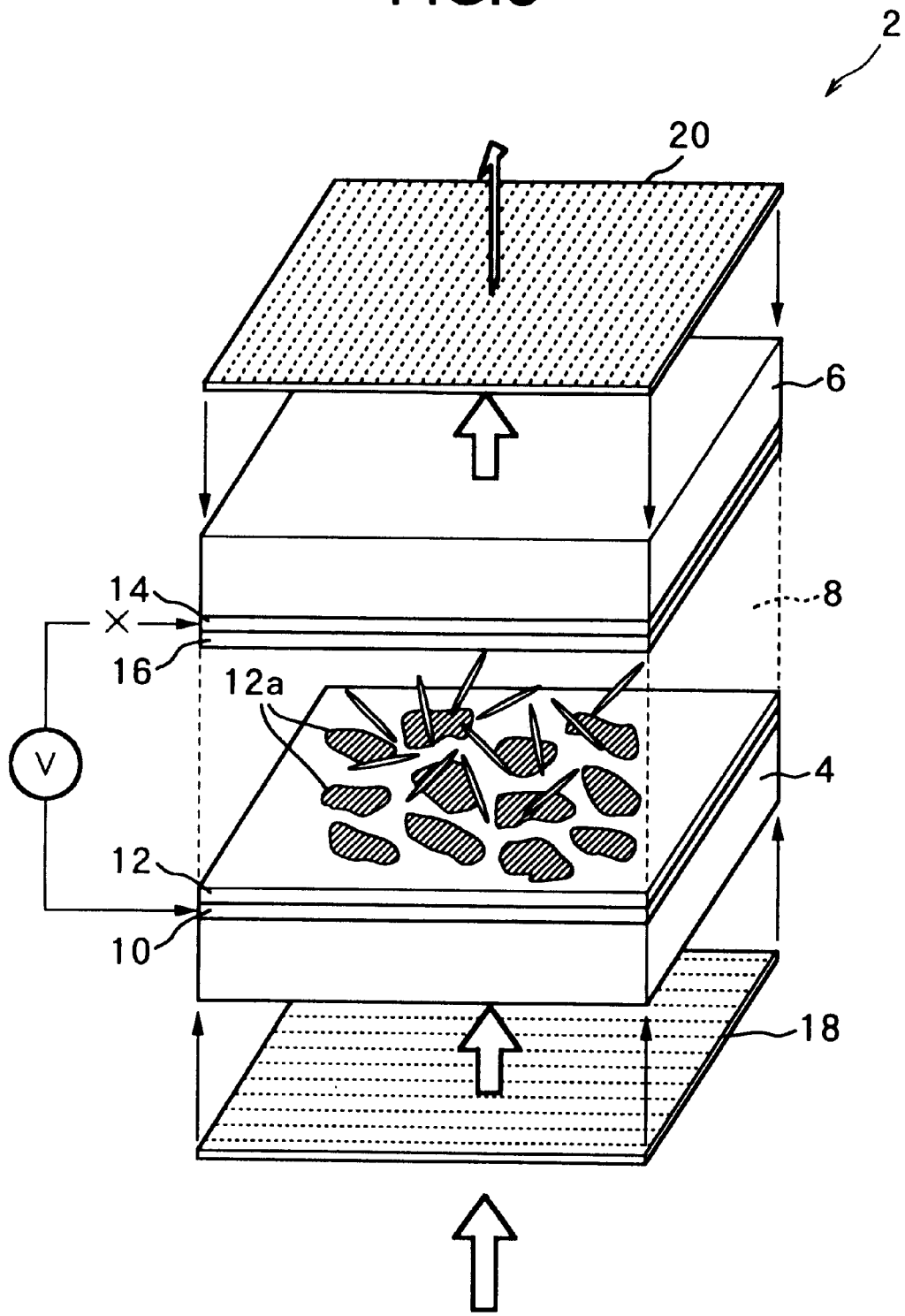
FIG. 8 is a structural view of the liquid crystal display apparatus showing the situation of introduction of damage into the alignment film by the irradiation of the laser beam.

FIG. 8 shows a situation where damage 12a is introduced into the alignment film 12 by the irradiation of this laser beam, the molecular orientation function of the alignment film 12 is lowered by this, and the molecular orientation direction of liquid crystal is scattered.

Figure 9:
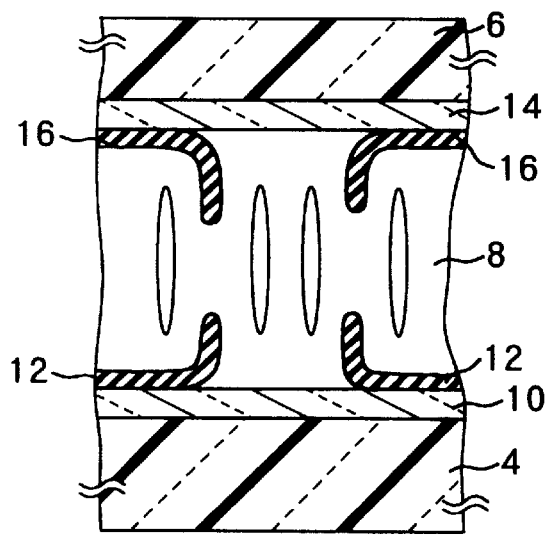
FIG. 9 is an explanatory view showing the cross-section when damage is introduced into the alignment film by actually using the present invention.

Further, FIG. 9 is an explanatory view showing the cross-section of the liquid crystal panel 2 when the damage 12a is actually introduced into the alignment films 12 and 16 by using the present invention.

From FIG. 9, it can be seen that under the irradiation conditions of this embodiment, holes are made in the alignment films 12 and 16, the edges of the alignment films 12 and 16 roll up at the peripheries of the holes, and the liquid crystal molecules are vertically oriented along the same. Since the length of one side of the pixel used in this embodiment is about 50 $\mu$m and the outer diameter of the damage due to the irradiation of the laser beam is about 2 $\mu$m, the light transmittance of the pixel can be changed by considerably fine increments.

Figure 7:
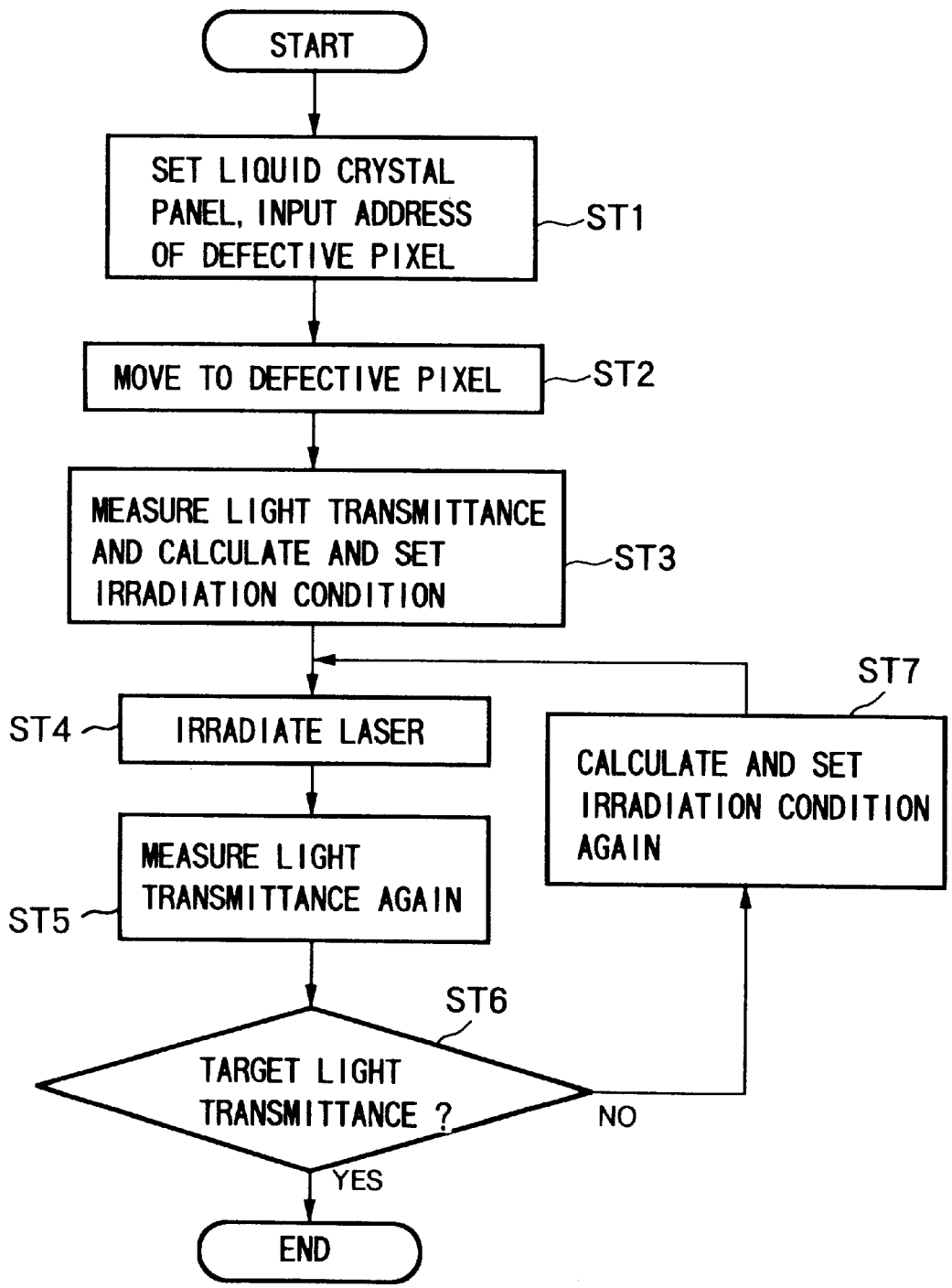
FIG. 7 is a flowchart showing the routine of a defect compensation method according to am embodiment of the present invention.

At step ST5 of FIG. 7, the light transmittance of the defective pixel is measured again after the irradiation of the laser beam. At the next step ST6, it is decided if the intended light transmittance is achieved.

Figure 10:
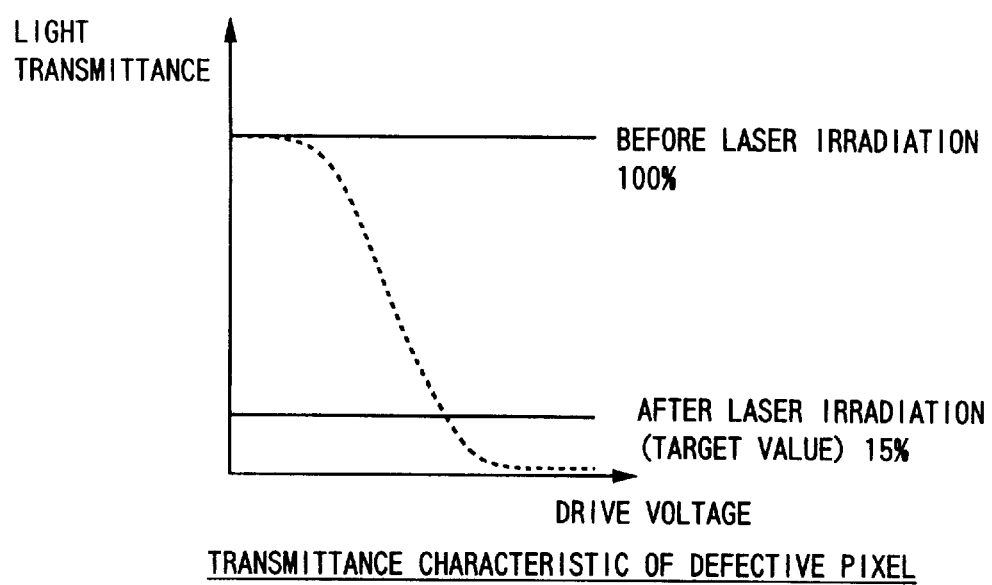
FIG. 10 is a characteristic view of the transmittance showing the situation of the change of the light transmittance before and after the irradiation of the laser beam where the trouble mode of the defective pixel is disconnected due to a pattern defect etc.

FIG. 10 is a characteristic view of the transmittance showing the change of the light transmittance before and after the irradiation of the laser beam where the trouble of the defective pixel is disconnection due to a pattern defect. The light transmittance in this defective pixel remains a constant value since the drive voltage is not applied. When this value is assumed to be 100%, the irradiation of the laser beam enables the light transmittance to be reduced to the target value of for example 15%.

When it is decided at step ST6 of FIG. 7 that the intended light transmittance has been achieved, the defect compensation process is ended.

Where it has not been achieved, the controller 44 calculates the irradiation conditions again (step ST7). the routine returns to before step ST4, and the laser beam is irradiated again. Step ST4 to step ST7 are repeated until the intended light transmittance is achieved.

As explained above, according to the defect compensation method and defect compensation apparatus of the present invention, the molecular orientation function of the alignment film is lowered by irradiation by a laser beam, so the correction of the light transmittance etc. can be carried out more easily than changing the optical properties of other parts.

Further, if this defect compensation is carried out before arrangement of the polarizing plate or while monitoring the light transmittance, the defective pixels can be made to not stand out with a good controllability.

Further, if the laser beam is irradiated a number of times while shifting the irradiation position at the defective pixel, the stability of the laser irradiation will be good and the irradiation energy at each shot will be small as well, so the effect upon other parts (for example the deterioration of their optical characteristics) will be small and the controllability will be more improved.

As described above, since the controllability can be enhanced by the method of the present invention, it is easy to set the intended light transmittance. It is therefore possible to set it at the optimum value on the black display side so as to make the defective pixel not stand out.

As explained above, it is possible to provide a defect compensation method and defect compensation apparatus for a liquid crystal display apparatus which irradiate a defective pixel with a laser beam to correct its light transmittance etc. with a good controllability so as to prevent the defective pixel from standing out. Therefore, the present invention greatly contributes to the improvement of the yield of the liquid crystal display apparatuses and consequently the reduction of their price.

What is claimed is:

1. A defect compensation method for a liquid crystal display apparatus having an alignment film for aligning an orientation of liquid crystal molecules, said method comprising the steps of:

measuring the light transmittance of a defective pixel;

irradiating said alignment film at the part of a defective pixel by a laser beam, so as to lower a molecular orientation function; thereby correcting an amount of light emitted by said defective pixel with respect to a predetermined amount of incident light;

measuring the light transmittance of said defective pixel again after the irradiation of said laser beam;

calculating an optimum irradiation condition based on the result of said after-irradiation measurement; and repeating the irradiation of the laser beam and the measurement of the light transmittance until the predetermined light transmittance is obtained.

2. A defect compensation method for a liquid crystal display apparatus according to claim 1, wherein said liquid crystal display apparatus has two substrates each having an alignment film formed on one surface and a polarizing plate allowing only the light of a predetermined direction to pass therethrough on the other surface, and wherein said irradiating the laser beam is carried out after arranging the two substrates with the surfaces on which the alignment films are formed facing each other and filling the space therebetween with liquid crystal, but before arranging the polarizing plates.

3. A defect compensation method for a liquid crystal display apparatus according to claim 1, further comprising the step of:

setting the irradiation conditions of the laser beam so that a predetermined light transmittance is obtained based on the results of this measurement;

where said measuring step occurs before the irradiation of said laser beam.

4. A defect compensation method for a liquid crystal display apparatus according to claim 3, wherein when irradiating said laser beam, the laser beam is irradiated multiple times while changing the position of said defective pixel based on the result of said measurement of light transmittance.

5. A defect compensation method for a liquid crystal display apparatus according to claim 3, wherein
said predetermined light transmittance is set at the black color display side from an intermediate value of the light transmittance at a black color display and the light transmittance at a white color display of a normal pixel.

6. A defect compensation method for a liquid crystal display apparatus having an alignment film for aligning an orientation of liquid crystal molecules, said method comprising the steps of:
positioning a defective pixel of said liquid crystal display apparatus to be compensated for with respect to an axis of light based on an address of the defective pixel;
measuring the light transmittance of the defective pixel;
finding irradiation conditions of a laser beam based on the measured light transmittance, and then irradiating the alignment film at the part of the defective pixel of said liquid crystal display apparatus by the laser beam under the found irradiation conditions to lower its molecular orientation function;
measuring the light transmittance of the defective pixel after the irradiation of the laser beam again;
calculating an optimum irradiation condition based on the result of said after-irradiation measurement; and
repeatedly performing the irradiation of said laser beam and the remeasurement of said light transmittance until a desired light transmittance is obtained when the desired light transmittance cannot be obtained.

7. A defect compensation method for a liquid crystal display apparatus according to claim 6,
wherein said liquid crystal display apparatus has two substrates each having an alignment film formed on one surface and a polarizing plate allowing only the light of a predetermined direction to pass therethrough on the other surface, and
wherein said irradiating the laser beam is carried out after arranging the two substrates with the surfaces on which the alignment films are formed facing each other and filling the space therebetween with liquid crystal, but before arranging the polarizing plates.

8. A defect compensation method for a liquid crystal display apparatus according to claim 6, wherein
when irradiating said laser beam, the laser beam is irradiated a number of times while changing the position at said defective pixel based on the result of said measurement of light transmittance preceding this.

9. A defect compensation method for a liquid crystal display apparatus according to claim 6, wherein
said predetermined light transmittance is set at the black color display side from an intermediate value of the light transmittance at a black color display and the light transmittance at a white color display of a normal pixel.

10. A defect compensation apparatus for a liquid crystal display apparatus having an alignment film for aligning the orientation of the liquid crystal molecules, comprising
a light source which emits light to a defective pixel;
a light receiving means for receiving the light emitted from the defective pixel;
a measuring means for measuring the amount of the light emitted by the defective pixel with respect to the predetermined amount of incident light based on the amount of light received by the light receiving means;
a calculating means for calculating an optimum irradiation condition based on the result of said measuring means;
a controlling means for setting the irradiation conditions of a laser so that the light of the predetermined amount of emitted light is output from the defective pixel;
a laser irradiating means for irradiating the laser beams to the alignment film at the part of the defective pixel based on the irradiation conditions to lowering the molecular orientation function.

11. A defect compensation apparatus for a liquid crystal display apparatus according to claim 10, further comprising a changing means for changing the irradiation position of the laser beam by a predetermined amount at the defective pixel,
wherein said irradiation conditions include the amount of displacement, the direction of displacement, and the number of times of displacement of the irradiation position of the laser beam by the displacing means.

* * * * *

UNITED STATES PATENT AND TRADEMARK OFFICE
CERTIFICATE OF CORRECTION

PATENT NO. : 6,097,462
DATED : August 1, 2000
INVENTOR(S) : Ho Keng Koe

Page 1 of 1

It is certified that error appears in the above-identified patent and that said Letters Patent is hereby corrected as shown below:

<u>Column 10,</u>
Line 31, change "lowering" to -- lower --.

Signed and Sealed this

Twenty-fifth Day of December, 2001

*Attest:*

JAMES E. ROGAN
*Attesting Officer*     *Director of the United States Patent and Trademark Office*